Nov. 2, 1965          W. B. DUFFY ETAL          3,214,878
PUSH-IN ASSEMBLY AND FASTENER THEREFOR
Filed May 28, 1964                              2 Sheets-Sheet 1

INVENTOR
WILLIAM B. DUFFY
RICHARD A. HARTMAN
BY
Charles F. Chisholm
ATTORNEY

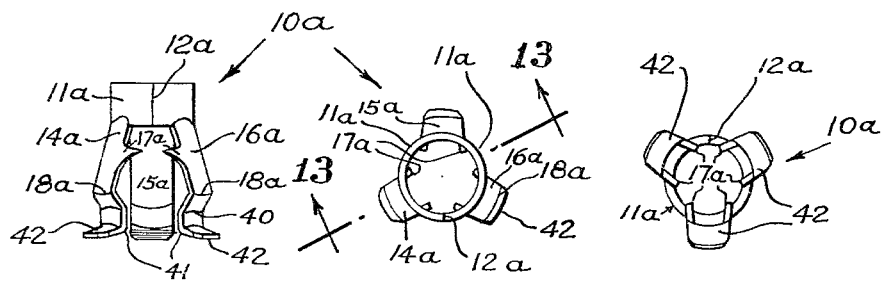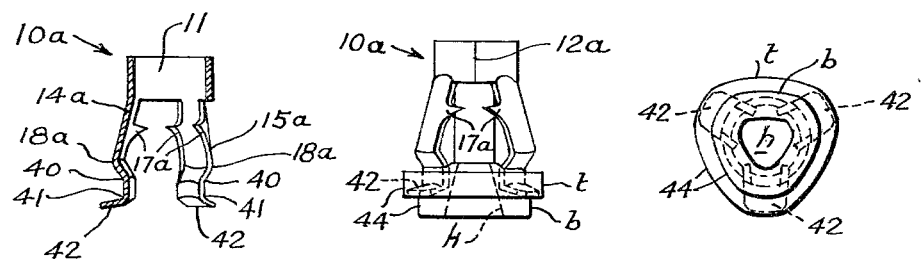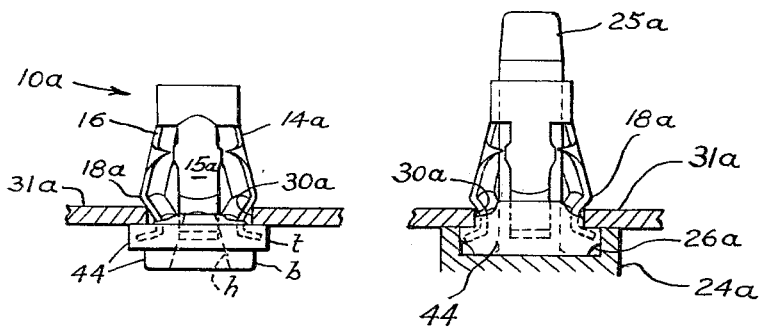

United States Patent Office 3,214,878
Patented Nov. 2, 1965

3,214,878
PUSH-IN ASSEMBLY AND FASTENER THEREFOR
William B. Duffy, Berkeley Heights, and Richard A. Hartman, Madison, N.J., assignors to United-Carr Incorporated, Boston, Mass., a corporation of Delaware
Filed May 28, 1964, Ser. No. 371,037
7 Claims. (Cl. 52—717)

This invention relates to a push-in assembly, subassembly, and fastener. The present application is a continuation-in-part of application S.N. 223,154 filed September 12, 1962, now abandoned.

There are many instances in which it is desired to attach fixtures (members) to supporting plates, and push-in arrangements have been used for the purpose. Studs which project from the fixtures are pushed into holes in the plates. Associated with each stud-and-hole is a fastener which is self-holding upon completion of the push-in movement. In some arrangements the fastener is preassembled with the plate and then the stud is pushed in. In other arrangements the fastener is preassembled with the stud and then the stud-and-fastener are pushed in.

Through use of the present invention the following advantages may be achieved in an assembly and fastener of the push-in type: (a) the space occupied by the fastener may be reduced to a minimum, (b) the assembly may be sealed against the passage of liquid through the hole in the supporting plate, (c) the cost of the fastener and assembly may be reduced as compared to the cost of push-in fasteners and assemblies known to us which will give comparable performance, (d) the fasteners may be made on a quantity-production basis by procedure and with tools which are reliable and relatively inexpensive, (e) the fastener may be produced in a manner which results in a relatively small amount of scrap metal, and (f) the fasteners may be rendered non-tangling, for advantageous handling in bulk; and with one disclosed form of the invention additional advantages may be achieved, viz., (g) the fastener may be preassembled with the stud quickly and easily, (h) the resultant subassembly may be handled without likelihood of the fastener becoming detached, and (i) the final assembly may be completed rapidly, easily and with certainty.

Other objects and advantages will be apparent from the drawings and the description hereinafter.

Among many other uses, the assembly and fastener of the present invention are well-suited for affixing certain items of trim to an automobile body.

For clarity and ease of reference it will be assumed that the supporting plate is horizontal, that the fixture (supported member) is beneath the plate, and that the fastener and the stud are inserted upwardly through the plate. However, it is to be understood that there is no limitation upon the positioning of the assembly; the assembly may be, and usually is, in other oriented positions. In the claims, as well as in the description, parts may at times be identified by specific names for ease of reference and ready understanding, but such nomenclature is to be understood as having the broadest meaning consistent with the context and with the concept of our invention as distinguished from the prior art.

The best modes that we have thus far contemplated of carrying out the invention are illustrated in the accompanying drawings, forming part of this specification. Except as otherwise indicated, the description applies to the specific form or forms of the invention shown in the drawings and being referred to in the description. The description does not necessarily refer to any other form in which the invention may be embodied. The claims, however, do embrace other forms in which the invention may be embodied.

In the drawings the thickness of sheet metal is necessarily exaggerated.

FIGURES 1 through 9 relates to a first form of the invention, in which our fastener is adapted to be preassembled with a fixture-stud and then the stud-and-fastener be pushed into a hole in the plate.

In FIGURE 8 the fastener is seen from the rear as compared to the way it is seen in FIGURE 7.

FIGURES 10 through 17 relate to a second form of the invention, in which our fastener is adapted to be preassembled with the supporting plate and then the stud be pushed into the fastener.

Figures 2, 3:
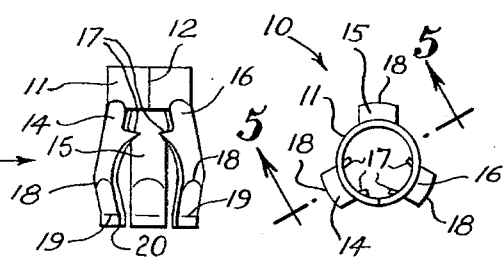
FIGURE 2 is an elevation of a fastener formed from the blank of FIGURE 1.
FIGURE 3 is a top plan view of the fastener shown in FIGURE 2.

FIGURE 10 is an elevation of a fastener of the second form of the invention. FIGURE 10 corresponds to FIGURE 2, which shows a fastener of the first form of the invention.

FIGURE 11 is a top plan view of the fastener shown in FIGURE 10. FIGURE 11 corresponds to FIGURE 3, which shows a fastener of the first form of the invention.

FIGURE 12 is a bottom plan view of the fastener shown in FIGURE 11. FIGURE 12 corresponds to FIGURE 4, which shows a fastener of the first form of the invention.

FIGURE 13 is a vertical section taken on the line 13—13 of FIGURE 11. FIGURE 13 corresponds to FIGURE 5, which is a vertical section of a fastener of the first form of the invention.

FIGURE 14 is an elevation as in FIGURE 10 but showing a sealing ring affixed to the sheet-metal structure that is shown in FIGURE 10. FIGURE 14 corresponds to FIGURE 7, which shows a fastener-and-sealing-ring of the first form of the invention.

FIGURE 15 is a bottom plan view of the fastener-and-sealing-ring of FIGURE 14. There is no corresponding view of a fastener-and-sealing ring of the first form of the invention.

FIGURE 16 is an elevation, partially in section, showing a subassembly, viz., th fastener-and-sealing-ring of FIGURE 14 assembled with the plate on which the fixture is to be mounted. With the first form of the invention we make a different subassembly. In FIGURE 16 the fastener is seen from the rear as compared to the way that it is seen in FIGURE 14.

FIGURE 17 is an elevation, partially in section, showing a final assembly with the second form of the invention, viz., a fixture-stud pushed into the subassembly of FIGURE 16. FIGURE 17 corresponds to FIGURE 9, which shows a final assembly with the first form of the invention.

Figure 1:
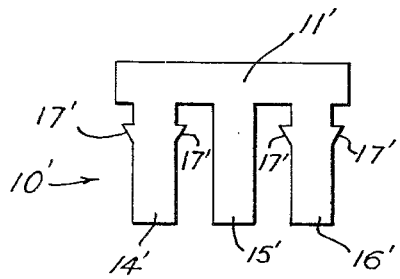
FIGURE 1 is a sheet-metal blank from which a fastener of the first form of the invention may be formed.

In FIGURE 1 the sheet-metal blank 10' has a striplike portion 11'. Extending from one edge of the striplike portion are leg portions 14', 15' and 16'. Extending from the opposite edges of each of leg portions 14' and 16', and located along the lengths of such leg portions at the positions shown, are triangular tabs 17'.

The blank 10' is formed into the fastener 10 of FIGURES 2–5. The striplike portion 11' is formed into a circular band 11, the two ends of the striplike portion being brought into abutting relationship at 12, and the sheet metal of the band being disposed parallel to the fastener axis. The leg portions 14', 15' and 16' of the blank are formed into the sheet-metal legs 14, 15 and 16, some or all of which are seen in each of FIGURES 2–9. The triangular tabs 17' are formed into barbs 17, some or all of which are seen in FIGURES 2–5 and 7–9.

In the fasteners that we have made, spring-back of the metal caused a slight and inconsequential crack at 12. Since the outside circumference of the band 11 is somewhat greater than the inside circumference, the crack tended to be wider on the outside of the band than on the inside of the band.

The legs 14, 15 and 16 are homogeneous with the band 11 at one edge thereof. The legs extend lengthwise of the fastener axis, each leg being inclined outwardly somewhat to a kneelike portion at 18, then being inclined inwardly to a bend at 19, and finally extending parallel to the fastener axis to the free end of the leg at 20. Above knees 18 the legs 14, 15 and 16 are arcuate in cross section, each having the cross-sectional shape shown in FIGURE 6 for leg 14. Legs 14 and 16 each have the barbs 17 projecting inwardly from their opposite edges, one pair of barbs for each of these two legs. We have made fasteners of the present invention in which the points of the barbs were located about one-third of the distance from the lower edge of the band 11 to the outermost point of the knee at 18.

Figures 4, 5, 6, 7:
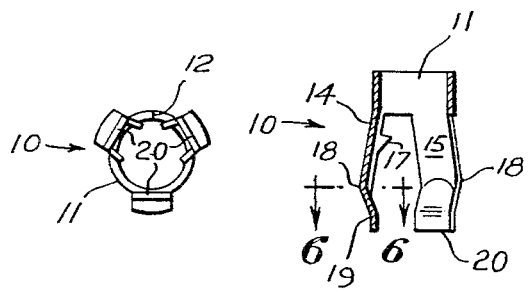
FIGURE 4 is a bottom plan view of the fastener shown in FIGURE 2.
FIGURE 5 is a vertical section taken on line 5—5 of FIGURE 3.
FIGURE 6 is a detail section showing the cross-sectional shape of the sheet metal at line 6—6 of FIGURE 5.
FIGURE 7 is an elevation as in FIGURE 2 but showing a sealing ring affixed to the sheet-metal structure that is shown in FIGURE 2.

In FIGURE 7 the sheat-metal fastener-structure 10 of FIGURES 1–5 is shown provided with a sealing ring 21, which is carried by the legs 14, 15 and 16. We have made the sealing ring of polyvinyl chloride and have molded it in place, with the lower portion of each leg 14, 15 and 16 embedded in the ring.

One use for the fastener of FIGURE 7 is in the fastening of die-cast trim to an automobile body. Ordinarily the trim is provided with integral studs that are spaced from one another, the studs being adapted to be inserted through holes in the sheet metal of the automobile body and a fastener being applied to each of the studs to hold the trim in place.

Figure 8:
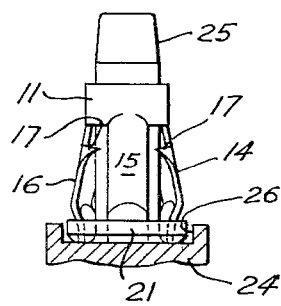
FIGURE 8 is an elevation, partially in section, showing a subassembly, viz., the fastener-and-sealing-ring of FIGURE 7 assembled with the stud of a fixture that is to be mounted.

FIGURE 8 shows such a piece of die-cast trim 24, this trim being the fixture that is to be mounted. The trim 24 is shown in cross section and one of the studs 25 that is integral with the trim is shown in elevation. The trim 24 is provided with an annular recess 26 which encircles the base of the stud. In FIGURE 8 the fastener of FIGURE 7 is shown assembled with the trim, preparatory to mounting the trim on the automobile body. The band 11 embraces the stud 25 toward its upper end; and the legs 14, 15 and 16 extend lengthwise of the stud to the bottom of the recess 26. The sealing ring 21 that is carried by the legs is located in the recess 26. The barbs 17 engage the stud under spring pressure.

We make the sealing ring 21 so that it can readily be pushed over the stud 25. Since the material of the sealing ring is readily displaceable, there is considerable leeway as regards the internal configuration of the ring 21 as molded on the sheet-metal fastener-structure. We give the band 11 an internal diameter that will cause it to closely embrace the stud 25. In so doing we make the internal diameter large enough so that the band 11 will readily slip over the largest stud that will be encountered among the commercial studs of the nominal diameter for which the fastener is intended. We set the points of barbs 17 sufficiently close to the axis of the fastener to cause them to make holding engagement with the smallest stud that will be encountered among the studs of the nominal diameter for which the fastener is designed. When the fastener is assembled with the fixture and stud as in FIGURE 8 the engagement of the barbs 17 with the stud flexes the legs 14 and 16 outwardly somewhat from their unstressed position.

Figure 9:
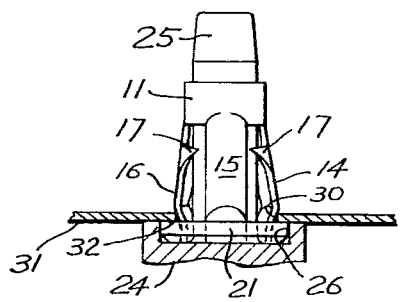
FIGURE 9 is the same type of view as FIGURE 8 but showing the final assembly, viz., the subassembly of FIGURE 8 assembled with a supporting plate, by pushing the stud-and-fastener of FIGURE 8 into a hole in the supporting plate.

To complete the assembly from the subassembly of FIGURE 8 the stud-and-fastener is telescoped through the hole 30 (FIGURE 9) in the automobile body or other supporting plate 31. In FIGURE 8 the outermost points of the knees 18 of the fastener legs are on a circle somewhat larger than the diameter of the hole 30 in the plate 31 (FIGURE 9). The band 11 readily passes through the hole 30 and, by wedging action between the upper portions of the legs 14, 15, 16 and and the margin of the hole, the legs are flexed inwardly and the knees 18 pass through the plate 31. Once the knees are through the plate the legs 14, 15 and 16 spring outwardly somewhat, setting up cam action between the plate 31 and the outer surfaces of the legs immediately beneath outermost points of the knees 18. This cam action causes the fastener to bias the stud in the direction which draws the fixture 24 against the plate 31. The recess 26 in the fixture is in counterbore relation to the hole 30 in the plate, and the sealing ring 21 makes sealing engagement between the fixture and an annular zone 32 of the plate 31, as is seen in FIGURE 9.

In the complete assembly shown in FIGURE 9 the margin of the hole 30 in the plate 31 holds the legs flexed inwardly, whereby the legs 14 and 16 cause the barbs 17 to dig into the stud. We position the knees 18 sufficiently above the lower ends 20 of the fastener legs to enable the fastener to co-operate with a plate 31 having some range of thickness. For example, we have made the particular fastener disclosed in FIGURES 2–9 for use with plate 31 having a nominal thickness of .040" but have positioned the knees 18 at a level which enables the fastener to accommodate not only commercial variations in the thickness of the plate but also buildup in thickness due to paint and also to punching-burrs at the edge of hole 30.

We form the fastener 10 of spring steel and harden and temper it after forming. For a fastener 10 intended for use with a stud of ⅛" nominal diameter we have used spring steel .015" thick and given the fastener an over-all length of .314" from the bottoms 20 of the legs to the top edge of the band 11.

In the particular fastener disclosed in FIGURES 2–9, which is for a stud of ⅛" nominal diameter, we have placed barbs 17 on legs 14 and 16, with no barbs on the leg 15. With barbs on only two of the legs it is easier to push the stud and fastener through the supporting plate to complete the assembly shown in FIGURE 9; and barbs on only two legs dig into the stud and make good holding engagement with the stud. For the particular ⅛"-size fastener shown in FIGURES 2–9 we have given the blank 10' (FIGURE 1) an over-all height of .312" and an over-all width of .450", given each leg portion 14', 15' and 16' a width of .080", spaced leg portion 15' a distance of .070" from each of leg portions 14' and 16', spaced each of leg portions 14' and 16' a distance of .035" from the adjacent ends of striplike portion 11'; additionally we have given the striplike portion 11' a height of .080", and have placed the top edges of triangular tabs 17' at a distance of .040" from the near edge of the striplike portion 11'.

In the event that there is occasion to demount the fixture, it can be done by inserting a sharp-edged tool between the fixture 24 and the plate 31 and forcibly withdrawing the stud and fastener.

For some uses it is unnecessary to seal the fixture to the supporting plate to prevent water or other liquid from passing through the hole 30. In such cases the sealing ring 21 may be omitted. The recess 26 may be omitted too, the fastener legs then being terminated at bends 19.

The fastener and assembly of FIGURES 10–17 are similar to the fastener and assembly of FIGURES 2–9. The reference characters of FIGURES 2–9 are use in FIGURES 10–17, insofar as applicable, with an "a" added thereto.

In FIGURES 10–17 the sheet-metal fastener 10a has a circular band 11a with a crack 12a. The band 11a and the crack 12a are the same as bend 11 and crack 12 in the fastener of FIGURES 2–9. Legs 14a, 15a and 16a are homogeneous with the band 11a at one edge of the band. Taken as a whole each leg extends generally lengthwise of the fastener, which means that each leg also extends generally lengthwise of the stud which is held by the fastener. From band 11a each leg of the fastener inclines outwardly to a knee at 18a, then inclines inwardly to a bend at 40, then proceeds parallel to the fastener axis (and the stud axis) to a bend at 41, and then extends outwardly to provide a foot 42. The angle between the foot 42 and the portion of the leg which lies between bends 40 and 41 is somewhat greater than 90 degrees, as is perhaps best seen in FIGURES 10 and 13.

In the fastener 10 as illustrated in FIGURES 2–9 there are barbs projecting from the opposite edges of only two of the fastener legs, viz., legs 14 and 16. While we may place barbs 17 on the opposite edges of all three of the legs of the fastener 10 of FIGURES 2–9, we prefer to have the barbs 17 on only two legs of that fastener. In the fastener 10a shown in FIGURES 10–17 we may place barbs 17a on only two legs of the fastener. However, with the fastener 10a we prefer to provide each of the three legs with barbs 17a as shown in FIGURES 10–17.

In FIGURES 14 and 15 the sheet-metal-fastener structure 10a of FIGURES 10–12 is shown provided with a sealing ring 44 which is molded about the feet 42 and also about the portions of the legs that lie between the bends 40 and 41. We have made the sealing ring 44 of polyvinyl chloride and have molded it in place as shown in FIGURES 14 and 15. As we mold it, the upper half of the sealing ring extends outwardly beyond the free ends of the feet 42, and the lower half extends to a lesser distance—as is seen in FIGURES 14 and 15.

The fastener 10a of FIGURES 10–17 may be used with or without the sealing ring 44 according to whether or not a seal is desired at the hole in the supporting plate through which the fastener-stud is to pass. In either case the fastener 10a is preassembled with the plate 31a by being pushed into the hole 30a until the knees 18a have passed through the plate 31a and snapped outwardly to approximately the position shown in FIGURE 16. Where the fastener 10a has the sealing ring 44, the sealing ring may interfere with full snap-out of legs 14a, 15a and 16a in the subassembly of fastener-and-plate; see FIGURE 16. However, the sealing ring is soft and, upon insertion of the fixture stud, the legs 14a, 15a and 16a will be pushed all the way out; see FIGURE 17.

As is seen in FIGURE 17, the margin of the hole 30a in the plate 31a is cammingly engaged on both sides of the plate by inclined portions of the legs of the fastener, viz. by the feet 42 and the leg portions between knees 18a and bends 41. This makes it feasible to use the same fastener 10a with plates 31a of different nominal thicknesses. We so proportion the parts that with (a) the thinnest plate 31a for which the fastener is intended, (b) the maximum plus variation from the nominal diameter of the hole 30a, and (c) the maximum minus variation from the circle on which the hole-engaging portions of the fastener-legs lie, the fully-inserted fastener in the subassembly of fastener-and-plate will be snug in the hole 30a and will remain so without any substantial inward flexure of the fastener-legs when the legs have moved to the outward limit established by the margin of the hole 31a. As a result of manufacturing variations the margin of the hole 31a will hold the legs of the fully-inserted fastener flexed inwardly somewhat in those instances in which (a) the plate 31a is of the maximum thickness for which the fastener is intended, (b) the diameter of the hole 30a has the maximum minus variation from its nominal size, and (c) the circle on which the plate-engaging portions of the fastener-legs lie has the maximum plus variation from its nominal size.

In the fastener 10a as manufactured the points of the barbs 17a are on a circle somewhat smaller than the smallest commercial stud of the nominal size for which the fastener is intended. The fastener 10a having been preassembled wtih the plate 31a as shown in FIGURE 16, the stud 25a of the fixture 24a is pushed through the plate-and-fastener to the assembled position shown in FIGURE 17. If the fastener is provided with a sealing ring 44, then the fixture 24a will have the recess 26a which telescopes over the bottom of the sealing ring 44. If no sealing ring is used, the assembly will be the same as in FIGURE 17 except that the sealing ring 44 will be missing; also the recess 26a in the fixture need be only deep enough to accommodate the feet 42 of the fastener.

The sealing ring 44 is molded in one piece but is composed of top washerlike portion $t$ and bottom washerlike portion $b$, these two portions being concentric. The top portion $t$ has the greater diameter and extends slightly beyond the free ends of the feet 42. The ring 44 is axially pierced by a hole $h$ of flat-wheel cross section and the unstressed periphery of which is slightly shorter than the periphery of the smallest commercial stud 25a of the nominal size for which the fastener-with-sealing-ring is intended.

Insertion of the stud 25a circularizes the hole $h$ and causes the sealing ring 44 to sealingly grip the stud 25a. In the subassembly of FIGURE 16 the top of the sealing ring 44 is already in sealing engagement with the plate 31a. In FIGURE 17 the fixture 24a has engaged and distorted the ring 44 in such manner as to augment the sealing action of the ring. However, we do not regard such augmentation of the sealing action as being essential. Leakage of water through the hole 30a can be sufficiently prevented by the initial grip of the stud by the sealing ring 44 and the subassembly-pressure of the top of the ring 44 against the bottom of the plate 31a.

For a stud having a nominal diameter of 3⁄16" we have made the fastener of FIGURES 14–17 from spring steel .015" thick, hardening and tempering the fastener after forming. And with a stud of that nominal diameter we have used a plate 31a which was either .036" or .044" thick, have given the hole 30a a nominal diameter of .250", have placed the knees 18a of the fastener on a circle having a nominal diameter of .297" and have made the band 11a with a nominal internal diameter of .192".

When packaged or handled in bulk the fasteners of FIGURES 2–5 and 10–13 are subject to tangling with one another, thereby hindering the picking out of individual fasteners. The fasteners of FIGURE 7 and FIGURES 14–15 are non-tangling by virtue of the rings 21 and 44, respectively. Thus the rings 21 and 44 are desirable, to expedite the picking out of individual fasteners, even where the assembly is one in which sealing is not needed and the rings 21 and 44 are to perform no function in the assembly.

We claim:
1. A fixture-supporting assembly comprising:
   a supporting plate having a hole through it;
   a fixture on one side of the plate,
      the fixture having a recess which overlaps the hole in the plate;
   a stud attached to the fixture and extending from within said recess in an axial direction transverse to said plate;

and a springy sheet-metal fastener located generally on the other side of said plate and comprising (a) a substantially cylindrical, sheet-metal band having spaced edges, and (b) a plurality of individual spring legs integral with said band and extending from one edge thereof in substantially the same axial direction as said band;

the stud of said fixture passing through the hole in the plate and continuing beyond the plate between the legs and into the band of said fastener;

the axis of said band being substantially coincident with the axis of said stud with the inner surface of said band embracing the stud at a location remote from said plate;

said band being spaced from said plate by said legs, said legs being distributed about the circumference of the band, being individually deflectable, extending lengthwise of the stud through the hole in said plate, and having their free ends in circumferentially-spaced relation in the recess in the fixture;

at least some of the legs having inwardly projecting barbs located between the plate and said band with the points of said barbs in engagement with the stud;

each leg having an outwardly bowed portion adjacent to said plate, and each leg being in inwardly forced engagement with the adjacent marginal edge of the hole in said plate causing said barbed engagement with the stud.

2. A fixture-supporting assembly as in claim 1 in which the fastener has three legs, no more and no less.

3. A fixture-supporting assembly as in claim 1 in which the legs have feet at their free ends, the feet overlapping the plate by extending outside of the margin of the hole in the plate.

4. A fixture-supporting assembly as in claim 1 in which the substantially cylindrical band of the fastener has a severance which extends from one edge of the band to the other.

5. A fixture-supporting assembly as in claim 1 in which (a) the fastener has three legs, no more and no less, and (b) the substantially cylindrical band of the fastener has a severance which extends from one edge of the band to the other.

6. A fixture-supporting assembly comprising:

a supporting plate having a hole through it;

a fixture on one side of the plate, the fixture having a recess which overlaps the hole in the plate;

a stud attached to the fixture and extending from within said recess in an axial direction transverse to said plate;

a springy sheet-metal fastener located generally on the other side of said plate and comprising (a) a substantially cylindrical, sheet-metal band having spaced edges, and (b) a plurality of individual spring legs integral with said band and extending from one edge thereof in substantially the same axial direction as said band;

the stud of said fixture passing through the hole in the plate and continuing beyond the plate between the legs and into the band of said fastener;

the axis of said band being substantially coincident with the axis of said stud with the inner surface of said band embracing the stud at a location remote from said plate;

said band being spaced from said plate by said legs, said legs being distributed about the circumference of the band, being individually deflectable, extending lengthwise of the stud through the hole in said plate, and having their free ends in circumferentially-spaced relation in the recess in the fixture;

at least some of the legs having inwardly projecting barbs located between the plate and said band with the points of said barbs in engagement with the stud;

each leg having an outwardly bowed portion adjacent to said plate, and each leg being in inwardly forced engagement with the adjacent marginal edge of the hole in said plate causing said barbed engagement with the stud;

and a sealing ring molded onto the free ends of the legs, the sealing ring substantially preventing liquid on one side of the plate from passing through the hole to the other side of said plate.

7. A fixture-supporting assembly as in claim 6 in which (a) the fastener has three legs, no more and no less, (b) the legs have feet at their free ends, the feet overlapping the plate by extending outside of the margin of the hole in the plate, and (c) the substantially cylindrical band of the fastener has a severance which extends from one edge of the band to the other.

References Cited by the Examiner

UNITED STATES PATENTS

| | | | |
|---|---|---|---|
| 2,244,975 | 6/41 | Tinnerman | 85—5 |
| 2,244,977 | 6/41 | Hansman et al. | 85—36 |
| 2,841,418 | 7/58 | Keating et al. | 85—36 |
| 2,984,878 | 5/61 | Hartman et al. | 24—73 |

FRANK L. ABBOTT, *Primary Examiner.*

RICHARD W. COOKE, Jr., *Examiner.*